March 23, 1954     D. W. BONNEY     2,672,964
AUTOMATIC CLUTCH

Filed June 12, 1950     3 Sheets-Sheet 1

David W. Bonney
INVENTOR.

March 23, 1954
D. W. BONNEY
2,672,964
AUTOMATIC CLUTCH
Filed June 12, 1950
3 Sheets-Sheet 2
Fig. 2
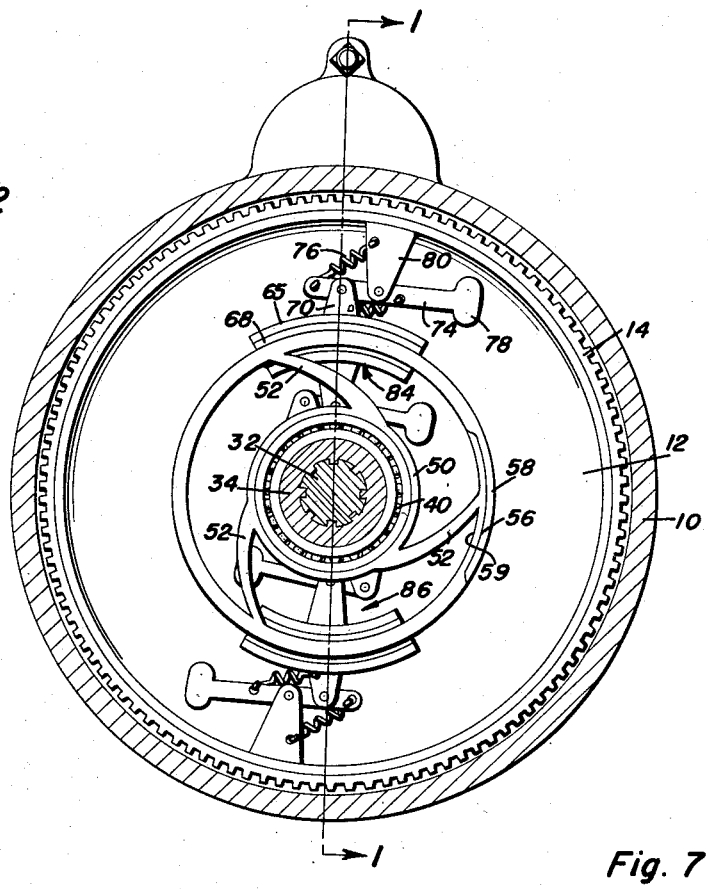
Fig. 6
Fig. 7
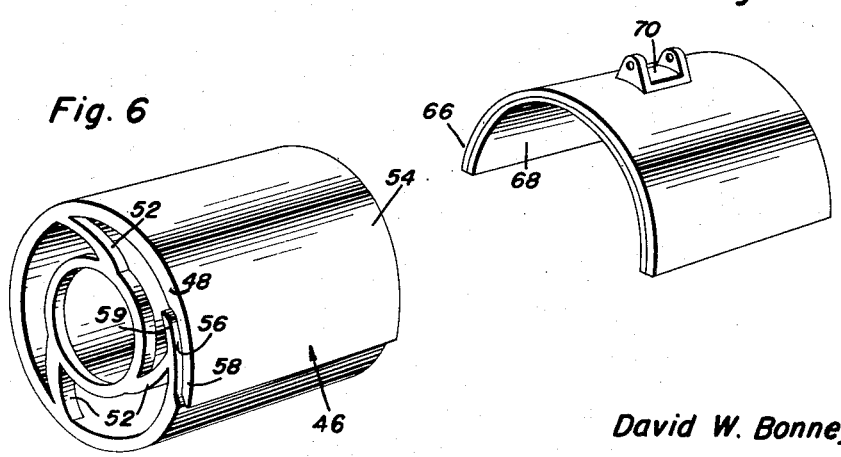
David W. Bonney
INVENTOR.
BY *Clarence A. O'Brien*
*and Harvey B. Jacobson*
Attorneys March 23, 1954 D. W. BONNEY 2,672,964
AUTOMATIC CLUTCH Filed June 12, 1950 3 Sheets—Sheet 3

David W. Bonney
INVENTOR.

BY *Clarence A. O'Brien*
*and Harvey B. Jacobson*
Attorneys

Patented Mar. 23, 1954

2,672,964

UNITED STATES PATENT OFFICE 2,672,964

AUTOMATIC CLUTCH

David W. Bonney, St. Louis, Mo.

Application June 12, 1950, Serial No. 167,634

1 Claim. (Cl. 192—48)

This invention relates to improvements in clutches adapted particularly for use in connection with vehicles of the engine-driven type.

An object of this invention is to provide an improved clutch which is normally in such condition as to disengage the propeller shaft from driving connection with the crank shaft but which causes the crank shaft to be lockingly connected with the propeller shaft in response to speed of either the crank shaft or the propeller shaft of the vehicle.

Other objects and features of importance will become apparent in following the description of the illustrated form of the invention.

In the drawings:

Figure 2 is a sectional view taken substantially on the line 2—2 of Figure 1 and in the direction of the arrows;

Figure 6 is a perspective view of the clutch element; and

Figure 7 is a perspective view of one of the brake shoes which is employed for operation of the clutch element, the illustration of Figure 7 differing slightly from the illustration of the other clutch shoes insofar as size is concerned.

Figure 1:
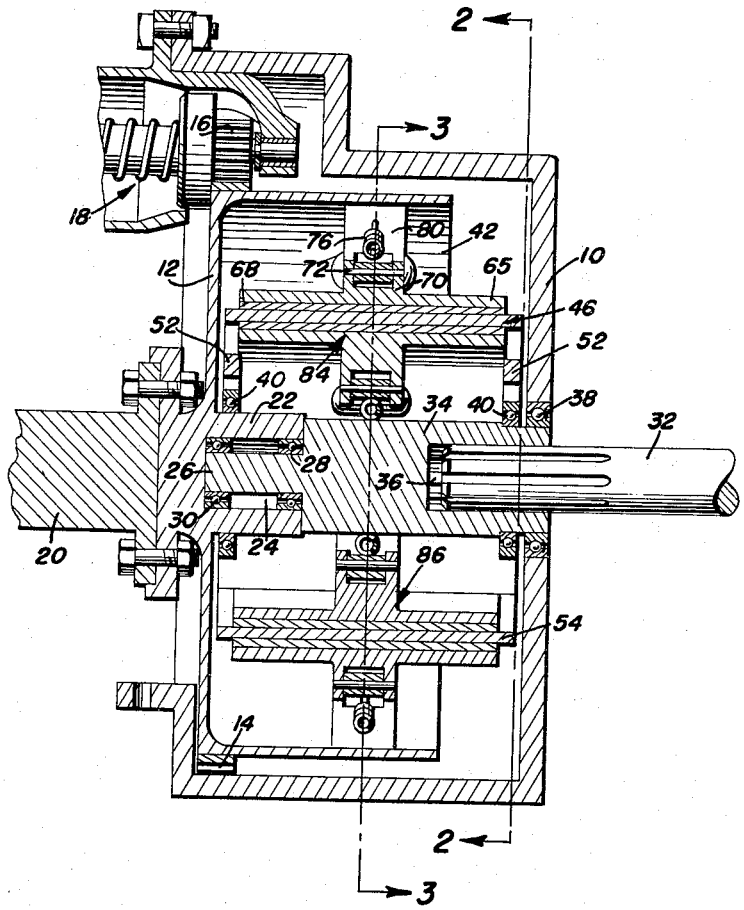
Figure 1 is a transverse sectional view of the clutch assembly showing it connected with various conventional parts of a vehicle running gear.
Figure 5:
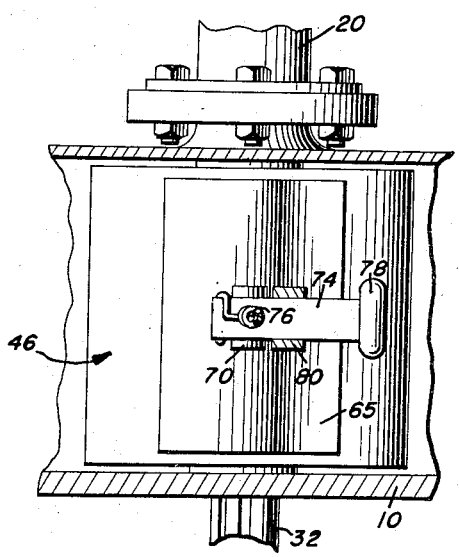
Figure 5 is a fragmentary sectional view taken substantially on the line 5—5 of Figure 3 and in the direction of the arrows.

In Figure 1 there is a case 10 with an engine-driven rotary member 12 disposed therein. This member is the engine flywheel having the ring gear 14 disposed therearound for engagement with the pinion 16, forming a part of the fragmentarily illustrated Bendix drive 18.

The rotary member 12 is coupled with the crank shaft 20 of an engine and has a stub shaft 22 protruding within the case 10. A bore 24 is formed in the stub shaft to accommodate the pilot shaft 26 which is disposed in the anti-friction bearings 28 and 30, respectively.

The pilot shaft 26 is integrally connected with the propeller shaft 32 driven member 34. The propeller shaft 32 is adapted to connect with reversing gear mechanism of conventional description and/or other gearing assemblies. The propeller shaft driven member 34 is provided with splines 36 to accommodate the splined end of the propeller shaft 32 and is disposed in the anti-friction bearings 38 and 40.

Forming a part of the member 12 is a skirt 42 concentrically arranged with the member 34. A freely floating clutch element 46 (Figure 6) is concentrically arranged between the skirt 42 and the member 34. As noted from inspection of Figure 6 and of Figure 2, the clutch element 46 consists of a pair of end rings 48 and 50 which are disposed respectively on the anti-friction bearings 40. One of the bearings 40 is disposed on the member 34, while the other bearing 40 is disposed on the stub shaft 22. Through this construction, the rings 48 and 50 are freely floating with respect to all of the other structure of the clutch assembly.

Figure 4:
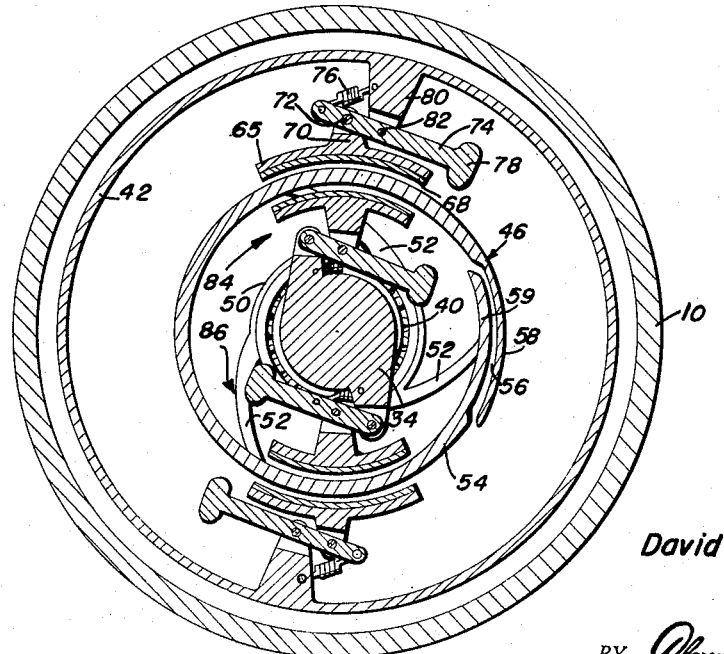
Figure 4 is a sectional view similar to Figure 3, the various clutching elements being shown in a second position.

A plurality of resilient arms 52 extend from each ring. At the outer ends of these arms is a cylinder 54 which is split longitudinally thereof, as at 56, to allow the portions 58 and 59 to overlap (Figure 4). The cylinder is thus expansible and yieldable.

Means for releasably locking the rotary member 12 with the clutch element 46 is provided. Also means are provided for releasably connecting the member 34 with the clutch element 46. Both of the last-mentioned means are responsive to the speed of rotation of the member 12, which is connected directly to either the crank shaft of an engine or a member which is operated by the crank shaft of the engine, and the member 34 is connected directly to the propeller shaft 32 of the vehicle or a member which is caused to operate by the propeller shaft.

Figure 3:
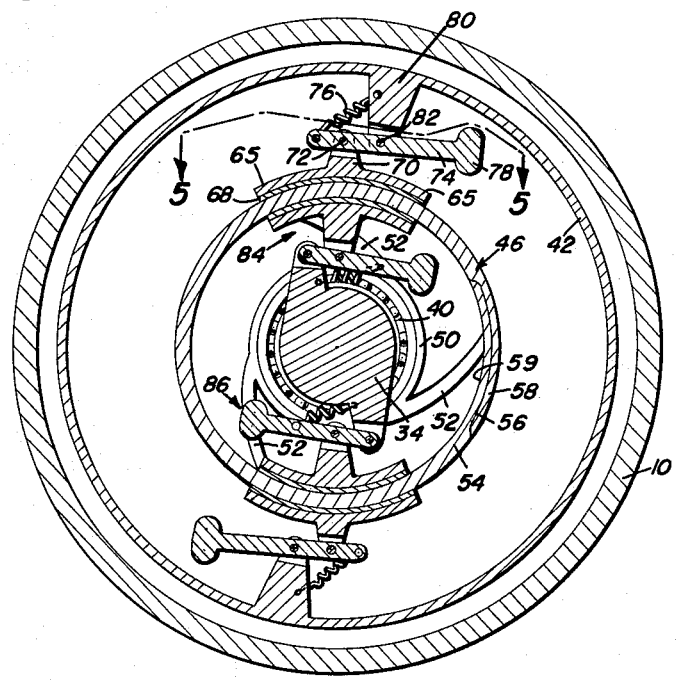
Figure 3 is a transverse view taken substantially on the line 3—3 of Figure 1 and in the direction of the arrows.

The referred to means consists of a number of speed-responsive brake shoes 65 (Figures 3 and 4). The brake shoes may be of any desired size (for example, see Figure 7), wherein the brake shoe 66 is larger than the illustrated brake shoes of Figures 3 and 4.

Each shoe is provided with a lining 68 to engage the surface of the cylinder 54 and each shoe is provided with a bracket 70 through which a pivot pin 72 is adapted to pass. Mounted for pivotal movement on the pin 72 is an arm 74 having a weight 78 at one end thereof and having a spring 76 secured to the other end thereof. This spring is fixed to the bracket 80 which is provided with a bifurcated end, between which is seated the arm 74. This arm is pivoted by means of a pin 82 between the bifurcations, to thereby form an assembly which will cause the brake lining 68 to press against the outer surface of the cylinder 54 in response to the speed of operation of the member 12 inasmuch as the bracket 80 is fixed to the skirt 42 thereof.

There are two identical brake shoe assemblies provided in the skirt 42. Similar brake shoe assemblies 84 and 86 are fixed in the interior of the cylinder 54 and to the propeller shaft operated member 54. The brake shoes of the assemblies 84 and 86 are adapted to contact the interior surface of the cylinder 54.

In operation, vehicle speed will be taken into consideration for facility of description, assuming that the clutch assembly is provided in a vehicle which has a standard engine and propeller shaft. When the engine is started and idling, the condition of the clutch assembly will be as disclosed in Figure 4. The member 12 will operate but not at a speed sufficient to cause the weighted arms 74 to operate. Then, when the engine is speeded to thereby cause faster rotation of the member 12, due to centrifugal force the brake linings 68 are pressed against the freely floating clutch element 46. This causes the clutch element to contract to the position disclosed in Figure 3. At this time, the shoes of the brake assemblies 84 and 86 are engaged, to thereby lockingly couple the clutch element with the rotary member 12 and the member 34 which is connected with the propeller shaft 32. Hence, the vehicle will operate.

Now, it is assumed that the vehicle has attained a speed, for example, 35 miles per hour. The engine is permitted to stop pulling, that is, the operator of the vehicle removes his foot from the accelerator pedal. At this time the vehicle, through its momentum, causes the propeller shaft 32 to be a driver shaft. The engine is then used as a brake. Accordingly, the assemblies 84 and 86 then press outwardly on the cylinder 54 to insure little or no slippage between the members 12 and 34 and the clutch element 46.

When the vehicle has slowed sufficiently so that the weights 78 of each brake arm allow the brake shoes to separate from the cylinder 54, the engine will be allowed to idle and the vehicle to coast, this being at a low speed.

Having described the invention, what is claimed as new is:

A clutch assembly comprising a case with a rotary driving member disposed therein, a freely floating clutch element disposed in said case, a propeller shaft driven member disposed in said case, and centrifugal means operable in response to the speed of said propeller shaft driven member for locking said shaft driven member to said floating clutch member, and centrifugal means secured to said rotary driving member and operable in response to a different speed for locking said rotary driving member to said clutch element, either of said centrifugal means being operable to clutch said driving and driven members together regardless of the operative position of the other centrifugal means.

DAVID W. BONNEY.

References Cited in the file of this patent

UNITED STATES PATENTS

| Number | Name | Date |
| --- | --- | --- |
| 742,816 | Varney | Oct. 27, 1903 |
| 1,615,814 | Smith | Jan. 25, 1927 |
| 1,744,637 | Jacobs et al. | Jan. 21, 1930 |
| 1,870,649 | Rawson | Aug. 9, 1932 |
| 1,984,131 | Hamilton | Dec. 11, 1934 |
| 2,255,591 | Simpson | Sept. 9, 1941 |

FOREIGN PATENTS

| Number | Country | Date |
| --- | --- | --- |
| 379,921 | Great Britain | Sept. 8, 1932 |